United States Patent [19]

Kinoshita et al.

[11] 4,247,332
[45] Jan. 27, 1981

[54] FLAME RETARDER HAVING ANTI-BLOOMING PROPERTY

[75] Inventors: Tsukuru Kinoshita; Shuji Masuda, both of Tokushima; Tetuo Hasegawa, Naruto, all of Japan

[73] Assignee: Otsuka Chemical Co., Ltd., Osaka, Japan

[21] Appl. No.: 18,878

[22] Filed: Mar. 9, 1979

[30] Foreign Application Priority Data

Mar. 18, 1978 [JP] Japan .................. 53-31246

[51] Int. Cl.³ ............................ C09D 5/18
[52] U.S. Cl. ............... 106/18.16; 106/18.13; 106/197 C; 162/159; 252/8.1; 260/29.6 H; 260/29.6 BM; 427/351; 427/397
[58] Field of Search ............ 106/197 C, 15.05, 18.13, 106/18.16; 162/159, 181 A, 181 R; 427/351, 372 R, 397; 252/8.1; 260/29.6 A, 29.6 BM

[56] References Cited

U.S. PATENT DOCUMENTS

| | | |
|---|---|---|
| 2,387,865 | 10/1945 | Van Kleeck .............. 106/18.12 |
| 2,766,139 | 10/1956 | Green et al. |
| 2,849,316 | 8/1958 | Lauring .................... 162/159 |
| 2,875,044 | 2/1959 | Dunn et al. ............... 162/159 |
| 3,257,267 | 6/1966 | Hay ......................... 106/18.15 |
| 4,038,451 | 7/1977 | Brown et al. ............. 162/159 |

*Primary Examiner*—Lorenzo B. Hayes
*Attorney, Agent, or Firm*—Armstrong, Nikaido, Marmelstein & Kubovcik

[57] ABSTRACT

An anti-blooming flame retarder consisting essentially of a water-soluble flame retardant agent and a water-soluble polymer, which is particularly suited for use in treating improved woods such as fiber-boards and plywoods. The improved woods are treated with the anti-blooming flame retarder and heat-treated.

6 Claims, 3 Drawing Figures

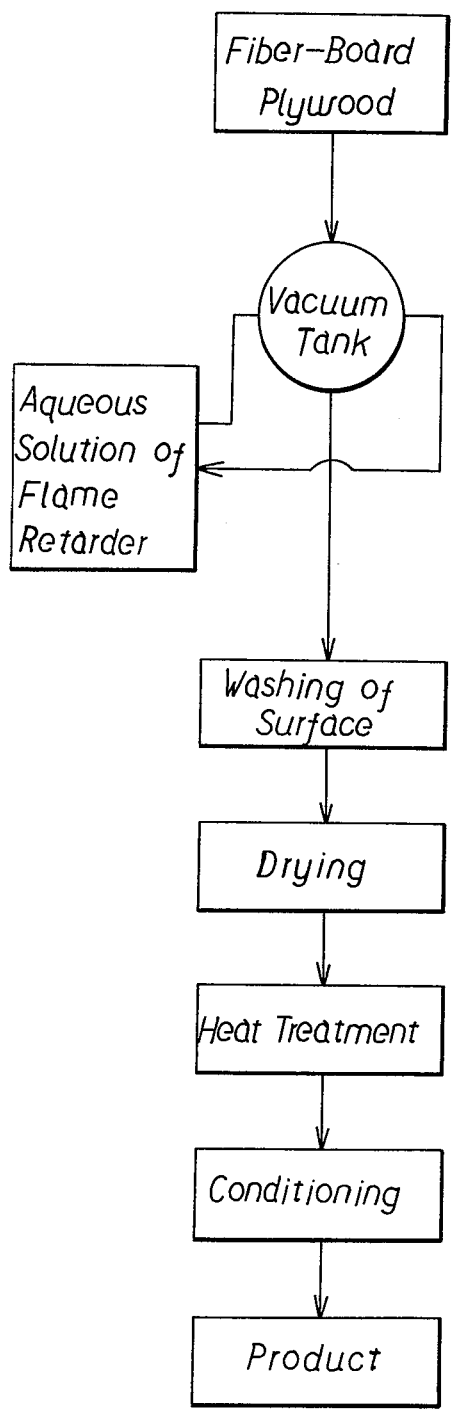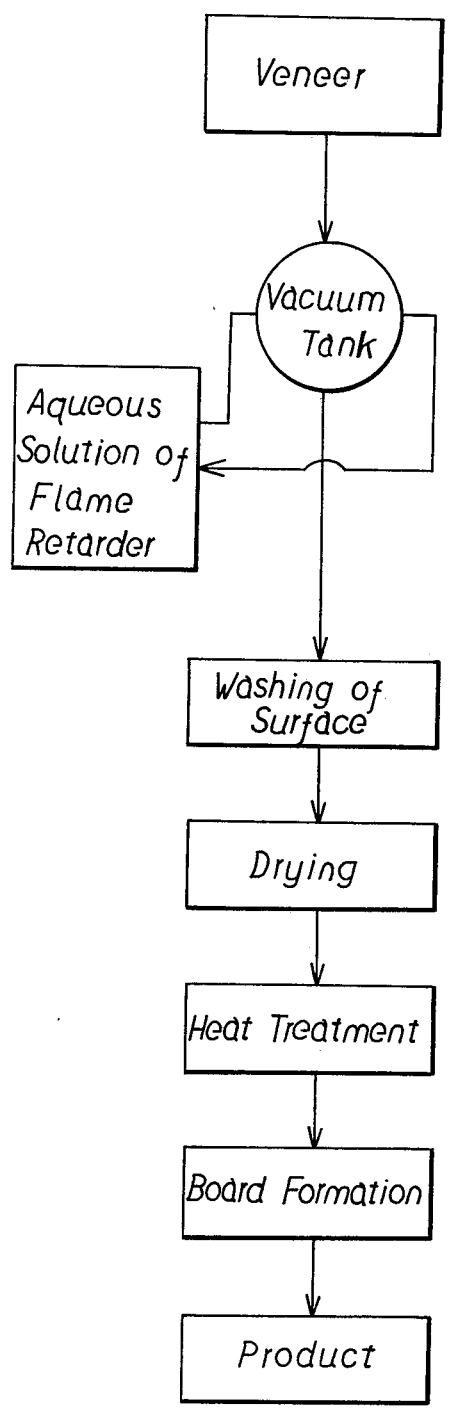

FLAME RETARDER HAVING ANTI-BLOOMING PROPERTY

BACKGROUND OF THE INVENTION

The present invention relates to a flame retarder having an excellent anti-blooming property, and more particularly to an anti-blooming flame retarder suited for use in imparting the flame retardancy to improved woods. The invention also relates to a method of application of the anti-blooming flame retarder.

In recent years, it is strongly required that house and building construction materials, interior finish materials for house, building and vehicles, furnitures, fittings and domestic electrified equipments and appliances are flame resistant, and various flame retardant agents are developed to satisfy the requirement. When treating plywoods employed as the materials for house, building, furnitures and fittings or fiber-boards employed as the materials for house, building, interior finish and domestic electrified equipments and appliances to render them flame retardant, water-soluble flame retardant agents are usually employed. However, the plywoods and fiber-boards treated with water-soluble flame retardant agents raise a problem that the water-soluble flame retardant agent contained within the plywoods or fiber-boards migrates to the surface with the lapse of time and causes the so-called blooming.

The blooming is caused mainly by the change in humidity of air with the lapse of time. That is to say, a water-soluble flame retardant agent contained in a woody material such as plywoods or fiber-boards is dissolved in or deliquesces by moisture, when the humidity of air is high and are in the wet state. Thereafter, when the humidity of air lowers, the moisture inside the material migrates to the surface and evaporates with the lowering of the humidity. At the same time, the water-soluble flame retardant agent which has been dissolved or deliquesced migrates from the inside of the material to the surface with the migration of the moisture, and appears in the form of crystal on the surface of the material when the mosture evaporates. This phenomenon takes place with every repetition of drying and wetting of air, and the flame retardant agent migrated to the surface is fixed and accumulated on the surface so that the surface presents an appearance as if it had a bloom. This phenomenon is called blooming.

Phosphorus-containing inorganic salts such as ammonium dihydrogenphosphate, diammonium hydrogenphosphate and condensed ammonium polyphosphate, bromine-containing inorganic salts such as ammonium bromide, boron-containing inorganic compounds such as sodium borate, potassium borate and boric acid, and aluminum-containing inorganic salts such as alum are generally employed as the water-soluble flame retardant agents for treating woody materials such as plywoods and fiber-boards. The solubility in water of these flame retardant agents is about 20 to about 60 g. to 100 g. of water at ordinary temperature, and sodium bromide, ammonium dihydrogenphosphate, diammonium hydrogenphosphate and condensed ammonium polyphosphate have the deliquescent property.

As a method for inhibiting or preventing the blooming, there are proposed (1) a method in which a material to be treated is impregnated with an aqueous solution of a water-soluble flame retardant agent and then heat-treated to render the water-soluble flame retardant agent water-resistant, and (2) a method in which a material is impregnated with an aqueous solution of a water-soluble flame retardant agent and the flame retardant agent is chemically bonded to the material to prevent the migration by moisture. However, the method (1) has the disadvantage of being hard to apply to most of the water-soluble flame retardant agents generally employed. That is to say, it is difficult to convert the usually employed inorganic salt flame retardant agents to water-resistant substances, even if heat-treated at the highest possible temperature within the range of a material to be treated not being deteriorated after impregnating the material therewith. The method (2) also has the disadvantage that applicable water-soluble flame retardant agents are limited to the above-mentioned phosphorus-containing inorganic salts which can undergo the esterification reaction with cellulose of the material to be treated. Moreover, even in the case of using the phosphorus-containing inorganic salts as flame retardant agents, it is difficult to bond the whole of the flame retardant agent contained in the material to cellulose of the material. Therefore, a fairly large amount of the flame retardant agent remains unreacted, and the occurrence of blooming due to the unreacted flame retardant agent is unavoidable.

Thus, the known methods of preventing the blooming are hard to apply to usual water-soluble flame retardant agents, or even if applicable, they cannot sufficiently prevent the blooming and, therefore, a flame retardant agent or a method of imparting flame retardancy, which can completely prevent the blooming, is strongly desired.

SUMMARY OF THE INVENTION

It has now been found that the blooming can be completely prevented by using a usual water-soluble flame retardant agent in combination with a water-soluble polymer.

According to the present invention, there is provided a flame retarder consisting essentially of a water-soluble flame retardant agent and 0.01% to 1% by weight of a water-soluble polymer based on the weight of the water-soluble flame retardant agent.

The present invention also provides a method of imparting flame retardancy to improved woods which comprises treating a woody material with an aqueous solution of a flame retarder consisting essentially of a water-soluble flame retardant agent and 0.01% to 1% by weight of a water-soluble polymer based on the weight of the water-soluble flame retardant agent, drying and heat-treating the woody material.

BRIEF DESCRIPTION OF THE DRAWINGS

FIG. 1 is a block diagram showing an instance of process steps for imparting the flame retardancy to fiber-boards or plywoods by employing the flame retarder of the present invention;

FIG. 2 is a block diagram showing an instance of process steps for producing flame retardant plywoods or laminated woods from veneers by employing the flame retarder of the present invention.

DETAILED DESCRIPTION

Figure 3:
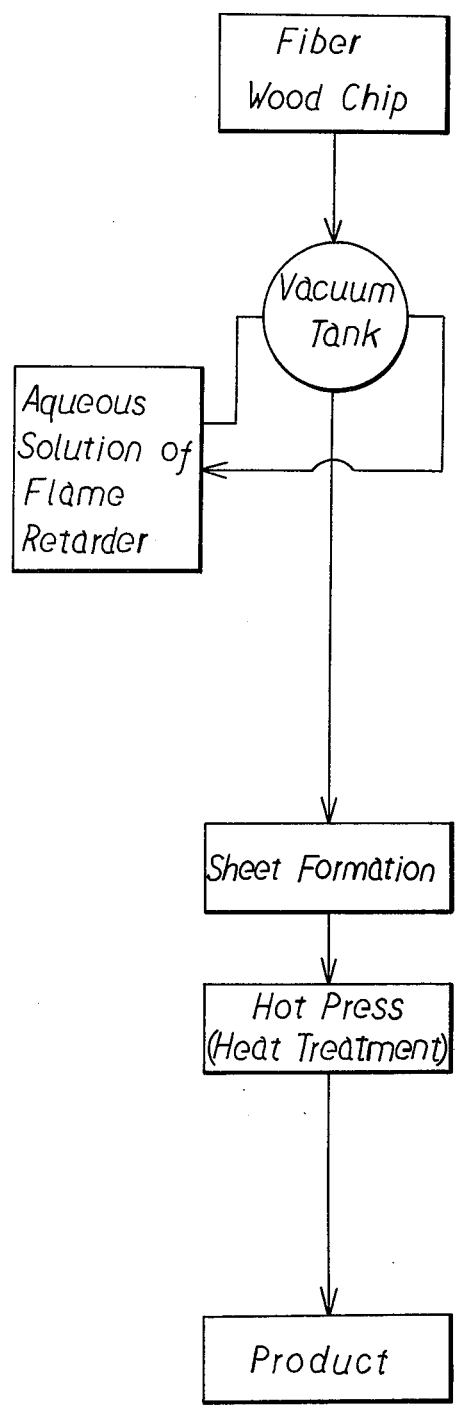
FIG. 3 is a block diagram showing an instance of process steps for producing flame retardant fiber-boards, chip boards or pulp boards from wood fibers or wood chips.

The flame retarder of the present invention has an excellent anti-blooming property, and is usefully employed for imparting the flame retardancy to improved woods such as fiber-boards, plywoods and the like. The anti-blooming effect of the flame retarder of the invention is exhibited by subjecting a woody material such as fiber-boards or plywoods to heat treatment after impregnating the woody material with the flame retarder. The heat treatment imparts the water resistance or moisture-absorption resistance to the water-soluble polymer, and since the water-soluble flame retardant agent fixed to cellulose of the impregnated material is coated or covered with such a water resistant or moisture-absorption resistant polymer, the dissolution or deliquescence of the water-soluble flame retardant agent by moisture is completely prevented. Therefore, no migration of the water-soluble flame retardant agent to the surface of the treated material by the change in humidity takes place, and the blooming can be completely prevented.

Any known water-soluble flame retardant agents can be employed in the present invention. For instance, there are mentioned water-soluble inorganic salt flame retardant agents, e.g. phosphorus-containing inorganic salts such as ammonium dihydrogenphosphate, diammonium hydrogenphosphate and condensed ammonium polyphosphate, bromine-containing inorganic salts such as ammonium bromide, boron-containing inorganic salts such as sodium borate and potassium borate, and aluminum-containing inorganic salts such as alum. Boric acid is also employed as well as the boron-containing inorganic salts. These water-soluble flame retardant agents may be employed singly or in admixture thereof.

The water-soluble polymers usable in the present invention are those changeable by heat treatment to have a water resistant or moisture-absorption resistance sufficient to prevent the dissolution in or deliquescence by moisture of the water-soluble flame retardant agents. The flame retarder of the present invention is usually employed in the form of aqueous solution and, therefore, the water-soluble polymers which are soluble also in an aqueous solution of the water-soluble flame retardant agent are preferably employed. This is important, since there is a case where a certain kind of water-soluble polymer is hard to be dissolved in an aqueous solution of the water-soluble flame retardant agent due to the salting out phenomenon, particularly when the concentration of the water-soluble flame retardant agent is high. Examples of the water-soluble polymer employed in the present invention are polyacrylic acid, polyacrylamide, polyacrylic hydrazide, alkali metal salts of polyacrylic acid, carboxymethyl cellulose, and polyvinyl alcohol. These water-soluble polymers may be employed singly or in admixture thereof.

The use of a slight amount of the water-soluble polymer is sufficient and, therefore, the flame retardant effect of the water-soluble flame retardant agent is not impaired at all. The water-soluble polymers is employed in an amount of 0.01% to 1% by weight, preferably 0.02% to 0.2% by weight, based on the weight of the water-soluble flame retardant agent. When the amount of the water-soluble polymer is less than the above range, the blooming cannot be sufficiently prevented. On the other hand, when the amount of the water-soluble polymer is larger than the above range, the viscosity of an aqueous solution of the flame retarder of the invention becomes too high and it is difficult to uniformly impregnate a woody material with the flame retarder extending from the surface to the inside of the material.

The flame retarder of the present invention may be in the form of solid or aqueous solution. When treating a woody material to render it flame retardant, the flame retarder of the invention is employed in the form of an aqueous solution, and the concentration of the water-soluble flame retardant agent in an aqueous solution of the flame retarder of the invention is selected from 1% to 50% by weight, preferably 20% to 50% by weight.

The flame retarder of the present invention is suitably applied to woody materials, especially to improved woods, for instance, plywoods such as plywoods for house and building construction and furnitures and overlaid plywoods, chip boards, laminated woods, fiber-boards such as soft boards, semi-hard boards and hard boards, and pulp boards.

The treatment of the improved woods to render them flame retardant is carried out by impregnating the improved woods with an aqueous solution of the flame retarder of the invention, drying and heat-treating the improved woods. The method of impregnation is not particularly limited, and there may be applicable usual methods such as a method of atmospheric pressure impregnation, a method of reduced pressure impregnation and a method of reduced pressure-pressure impregnation. The amount of an aqueous solution of flame retarder to be penetrated varies depending on a desired flame retardancy, and for instance, a plywood, a soft fiber-board and a hard fiber-board can contain up to 50% to 80% by weight, up to 300% to 400% by weight, and up to 40% to 50% by weight, of an aqueous solution of the flame retarder, respectively. A sufficient flame retardant effect can be exhibited, when the content of a water-soluble flame retardant agent in an improved woods falls within the range of 10% to 30% by weight.

The drying of the improved woods impregnated with an aqueous solution of the flame retarder is conducted at a temperature enough to remove the moisture within the improved wood, and is usually conducted at a temperature of 50° to 120° C., preferably 80° to 120° C. for 3 to 4 hours. When the drying temperature is lower than the above range, it takes too long time, and on the other hand, when the drying temperature is higher than the above range, the improved wood such as plywood or fiber-board tends to cause a change in shape, i.e. warping and deflection.

After drying, the improved wood is heat-treated to impart the water resistance or moisture-absorption resistance to a water-soluble polymer. The heat treatment temperature varies depending on the kind of the water-soluble polymer employed, and is usually selected from 100° to 160° C., preferably 140° to 160° C. When the heat treatment temperature is lower than the above range, it is hard to produce the anti-blooming effect even if the treatment is conducted for a long period of time. When the heat treatment temperature is higher than the above range, the wood fiber of the improved wood tends to deteriorate. The heating for the heat treatment may be conducted in any known manners, e.g. heating by hot air and direct heating by hot plate. The heat treatment time is usually selected from 15 to 60 minutes.

There is shown in FIG. 1 a typical example of process steps for imparting the flame retardancy to fiber-boards or plywoods, in which fiber-boards or plywoods are placed in a vacuum tank, impregnated under reduced pressure with an aqueous solution of a flame retarder of the invention, washed with water to remove the flame retarder on the surface, dried, heat-treated and then subjected to conditioning to give products.

In addition to the above-mentioned method, flame retardant improved woods may be produced by employing the flame retarder of the present invention in such a manner as impregnating a raw material, e.g. veneer, wood fiber such as pulp, and wood chip with an aqueous solution of the flame retarder and then forming the impregnated raw material into a board. There are shown in FIG. 2 and FIG. 3 respectively, a typical example of process steps for producing flame retardant plywoods or laminated woods from veneers, and a typical example of process steps for producing flame retardant fiber-boards, chip boards or pulp boards from wood fibers or wood chips. In FIG. 2, veneers are placed in a vacuum tank, impregnated under reduced pressure with an aqueous solution of a flame retarder, washed with water, dried and heat-treated, and boards are then formed from the flame retardant veneers to give products. In FIG. 3, wood fibers or wood chips are placed in a vacuum tank and impregnated under reduced pressure with an aqueous solution of a flame retarder, and boards are then formed from the impregnated wood fibers or chips and are subjected to a hot-press by which the drying and the heat treatment are simultaneously conducted, to give products.

The present invention is more specifically described and explained by means of the following Examples, in which all % are by weight unless otherwise noted.

EXAMPLE 1

Condensed ammonium polyphosphate was dissolved in water to prepare a 40% aqueous solution thereof. To the aqueous solution was then added polyacrylamide in an amount of 0.125% to the condensed ammonium phosphate to give an aqueous solution of a flame retarder.

EXAMPLES 2 to 6

Aqueous solutions of flame retarders were prepared in the same manner as in Example 1 except that the following water-soluble flame retardant agents were employed respectively, instead of condensed ammonium polyphosphate.

Example 2: Ammonium dihydrogenphosphate
Example 3: Diammonium hydrogenphosphate
Example 4: Ammonium bromide
Example 5: Sodium borate
Example 6: Alum

EXAMPLE 7

An aqueous solution of flame retarder was prepared in the same manner as in Example 1 except that polyvinyl alcohol was employed instead of polyacrylamide.

COMPARATIVE EXAMPLE 1

A 40% aqueous solution containing only condensed ammonium polyphosphate as a flame retardant agent was prepared in the same manner as in Example 1 except that the use of polyacrylamide was omitted.

EXAMPLE 8

A flame retardant hard fiber-board was produced by employing an aqueous solution of flame retarder prepared in the same manner as in Example 1 as follows:

A previously dried hard fiber-board having a size of 20 cm.×20 cm.×3 mm. and a free water content of 1% to 4% was placed in a vacuum tank, and was allowed to stand for 10 minutes under reduced pressure of 4 to 5 mmHg. The aqueous solution of flame retarder was then introduced into the tank, and the fiber-board was further allowed to stand for 5 minutes to impregnate it with the aqueous solution. After discharging the aqueous solution from the tank, the impregnated fiber-board was taken out and washed with water to remove the flame retarder on the surface. The fiber-board was then dried in a dryer at 80° C. for 4 hours and heat-treated in a hot air circulating thermostat at 140° C. for 30 minutes.

The thus obtained flame retardant hard fiber-board was then subjected to a blooming test as follows:

[Blooming test A]

A test specimen was allowed to stand at 60° C. and 98 to 100% RH for 5 days, and then dried in a dryer at 80° C. for 6 hours. This procedure was repeated 5 times.

[Blooming test B]

Absorbent cotton was put down on the bottom of a vessel, and water was poured into the vessel until the surface of the water reached the top surface of the cotton. A test specimen was placed on the cotton and allowed to stand for a day and night, and then dried in a dryer at 80° C. for 6 hours.

The test specimens subjected to the blooming tests A and B were observed with the naked eye, and the presence of blooming was judged according to the following criterion.

⊚: No blooming
○: Blooming being not observed with the naked eye
△: Blooming being slightly observed
X: Blooming being clearly observed The results of the blooming tests are shown in Table 1 together with the increase of the weight of fiber-board showing the content of an aqueous solution of flame retarder absorbed in the fiber-board by impregnation and the content of a flame retarder in the obtained flame retardant fiber-board.

The increase of the weight was calculated according to the following equation.

$$\text{Increase of weight (\%)} = \frac{\text{Weight of board after impregnation, drying or heat treatment} - \text{Weight of board before impregnation}}{\text{Weight of borard before impregnation}} \times 100$$

COMPARATIVE EXAMPLE 2

The procedure of Example 8 was repeated except that the aqueous solution of Comparative Example 1 was employed.

The result is shown in Table 1.

COMPARATIVE EXAMPLE 3

The procedure of Example 8 was repeated except that the heat treatment was omitted.

The result is shown in Table 1.

COMPARATIVE EXAMPLE 4

The procedure of Example 8 was repeated except that the heat treatment was carried out at 80° C. for one hour.

The result is shown in Table 1.

COMPARATIVE EXAMPLE 5

The procedure of Example 8 was repeated except that the impregnated fiber-board was subjected to air-drying at room temperature for a week instead of the drying at 80° C. for 4 hours and the heat treatment was omitted.

The result is shown in Table 1.

EXAMPLES 9 to 14

The procedures of Example 8 were repeated except that the aqueous solution of flame retarders obtained according to Examples 2 to 7 were employed respectively, instead of the aqueous solution of flame retarder obtained according to Example 1.

The results are shown in Table 1.

EXAMPLE 15

The procedure of Example 8 was repeated except that a plywood having a size of 20 cm.×20 cm.×5.5 mm. was employed instead of the hard fiber-board.

The result is shown in Table 1.

COMPARATIVE EXAMPLE 6

The procedure of Comparative Example 2 was repeated except that a plywood having a size of 20 cm.×20 cm.×5.5 mm. was employed instead of the hard fiber-board.

The result is shown in Table 1.

TABLE 1

| Example No. | Flame retarder | Drying | Heat treatment | Increase of weight (%) After impregnation | After drying | After heat treatment | Blooming Method A | Method B |
| --- | --- | --- | --- | --- | --- | --- | --- | --- |
| Ex. 8 | Example 1 | 80° C. × 4 hr. | 140° C. × 30 min. | 45 | 17 | 13 | ◎ | ◎ |
| Com. Ex. 2 | Comparative Example 1 | 80° C. × 4 hr. | 140° C. × 30 min. | 45 | 17 | 13 | X | X |
| Com. Ex. 3 | Example 1 | 80° C. × 4 hr. | — | 44 | 16 | — | Δ | X |
| Com. Ex. 4 | Example 1 | 80° C. × 4 hr. | 80° C. × 1 hr. | 47 | 17 | 17 | Δ | X |
| Com. Ex. 5 | Example 1 | Air-drying at room temp. | — | 45 | 19 | — | Δ | X |
| Ex. 9 | Example 2 | 80° C. × 4 hr. | 140° C. × 30 min. | 46 | 16 | 13 | ◎ | ○ |
| Ex. 10 | Example 3 | 80° C. × 4 hr. | 140° C. × 30 min. | 48 | 17 | 14 | ◎ | ○ |
| Ex. 11 | Example 4 | 80° C. × 4 hr. | 140° C. × 30 min. | 45 | 17 | 14 | ◎ | ○ |
| Ex. 12 | Example 5 | 80° C. × 4 hr. | 140° C. × 30 min. | 47 | 18 | 15 | ◎ | ○ |
| Ex. 13 | Example 6 | 80° C. × 4 hr. | 140° C. × 30 min. | 46 | 17 | 14 | ◎ | ○ |
| Ex. 14 | Example 7 | 80° C. × 4 hr. | 140° C. × 30 min. | 45 | 17 | 13 | ◎ | ◎ |
| Ex. 15 | Example 1 | 80° C. × 4 hr. | 140° C. × 30 min. | 75 | 29 | 23 | ◎ | ◎ |
| Com. Ex. 6 | Comparative Example 1 | 80° C. × 4 hr. | 140° C. × 30 min. | 80 | 32 | 28 | X | X |

What we claim is:

1. A flame retarder aqueous solution consisting of a water-soluble flame retardant agent and 0.01% to 1% by weight of a water-soluble polymer based on the weight of said water-soluble flame retardant agent, said water-soluble polymer being changeable by heat treatment to have a water resistance sufficient to prevent the migration of said water-soluble flame retardant agent and being at least one member selected from the group consisting of polyacrylic acid, polyacrylamide, polyacrylic hydrazide, alkali metal salts of polyacrylic acid and polyvinyl alcohol, and said water-soluble flame retardant agent being at least one member selected from the group consisting of ammonium dihydrogenphosphate, diammonium hydrogenphosphate, condensed ammonium polyphosphate, ammonium bromide and alum.

2. A method of imparting flame retardancy to improved woods which comprises impregnating a woody material with an aqueous solution consisting of a water-soluble flame retardant agent and 0.01% to 1% by weight of a water-soluble polymer based on the weight of said water-soluble flame retardant agent, drying the impregnated woody material and heat-treating the dried woody material at a temperature of 100° to 160° C. for 15 to 60 minutes, said water-soluble polymer being at least one member selected from the group consisting of polyacrylic acid, polyacrylamide, polyacrylic hydrazide, alkali metal salts of polyacrylic acid and polyvinyl alcohol, and said water-soluble flame retardant agent being at least one member selected from the group consisting of ammonium dihydrogenphospate, diammonium hydrogenphosphate, condensed ammonium polyphosphate, ammonium bromide and alum.

3. The method of claim 2, wherein said woody material is pulp board.

4. The method of claim 2, wherein said woody material is a veneer which is formed into a board after the heat treatment.

5. The method of claim 2, wherein said woody material is a wood fiber or wood chip which is formed into a board before the drying and heat treatment.

6. A method as in claim 2, wherein said woody material is laminated wood.

* * * * *